United States Patent [19]

Warrick

[11] Patent Number: 4,595,035
[45] Date of Patent: Jun. 17, 1986

[54] SOLENOID VALVE

[75] Inventor: Frank G. Warrick, Muskegon, Mich.

[73] Assignee: Sealed Power Corporation, Muskegon, Mich.

[21] Appl. No.: 744,670

[22] Filed: Jun. 17, 1985

Related U.S. Application Data

[63] Continuation of Ser. No. 577,853, Feb. 7, 1984, abandoned.

[51] Int. Cl.$^4$ .......................................... F15B 13/044
[52] U.S. Cl. .......................... 137/625.65; 251/129.14; 251/129.21
[58] Field of Search ............. 137/625.65, DIG. 2; 251/139, 141, 129.02, 129.05, 129.06, 129.14, 129.21; 285/132, 133 R, 137 R, 167

[56] References Cited

U.S. PATENT DOCUMENTS

| | | | |
|---|---|---|---|
| 1,333,626 | 3/1920 | Moard | 251/139 |
| 1,664,613 | 4/1928 | French | 251/139 |
| 2,267,515 | 12/1941 | Wilcox et al. | 137/625.65 |
| 2,860,850 | 11/1958 | Rhodes et al. | 251/139 |
| 3,355,145 | 11/1967 | Castelet | 251/139 |
| 3,470,892 | 10/1969 | Barker | 251/139 |
| 3,550,632 | 12/1970 | Noakes et al. | 251/141 |
| 3,828,818 | 8/1974 | Hunt | 137/625.65 |
| 3,856,260 | 12/1974 | Giordana | 137/625.65 |
| 3,921,670 | 11/1975 | Clippard et al. | 137/625.65 |
| 4,306,589 | 12/1981 | Harned et al. | 251/141 |
| 4,320,781 | 3/1982 | Bouvet et al. | 137/625.65 |

Primary Examiner—Margaret A. Focarino
Assistant Examiner—Noah Kamen
Attorney, Agent, or Firm—Barnes, Kisselle, Raisch, Choate, Whittemore & Hulbert

[57] ABSTRACT

A pulse width modulated valve comprising a valve housing including a transverse wall, an extension extending axially from the transverse wall and a peripheral wall extending axially from the periphery of the transverse wall in a direction opposite to the direction in which the axial extension extends. A pole piece extends axially inwardly of the housing and a transverse wall extends radially outwardly into engagement with the peripheral wall and is connected thereto. The pole piece defines a first seat, and a non-magnetic insert is positioned in an axial passage in the axial extension defines a second seat. A spring loaded ball has limited movement between the first and second seats. The insert defines passages to the exterior of the axial extension. A coil assembly is positioned in the housing. When fluid is applied to the axial passage in the insert and the coil is de-energized, the spring holds the ball against the second seat and prevents flow through an axial passage in the insert while permitting communication between the passages defined by the insert about the ball and second seat through an axial passage in the pole, and when the solenoid is energized, the ball is drawn toward the first seat to close communication to the axial passage in the pole and permit flow from the axial passage in the insert past the second seat and through the passages defined by the insert to the exterior of the axial extension.

18 Claims, 7 Drawing Figures

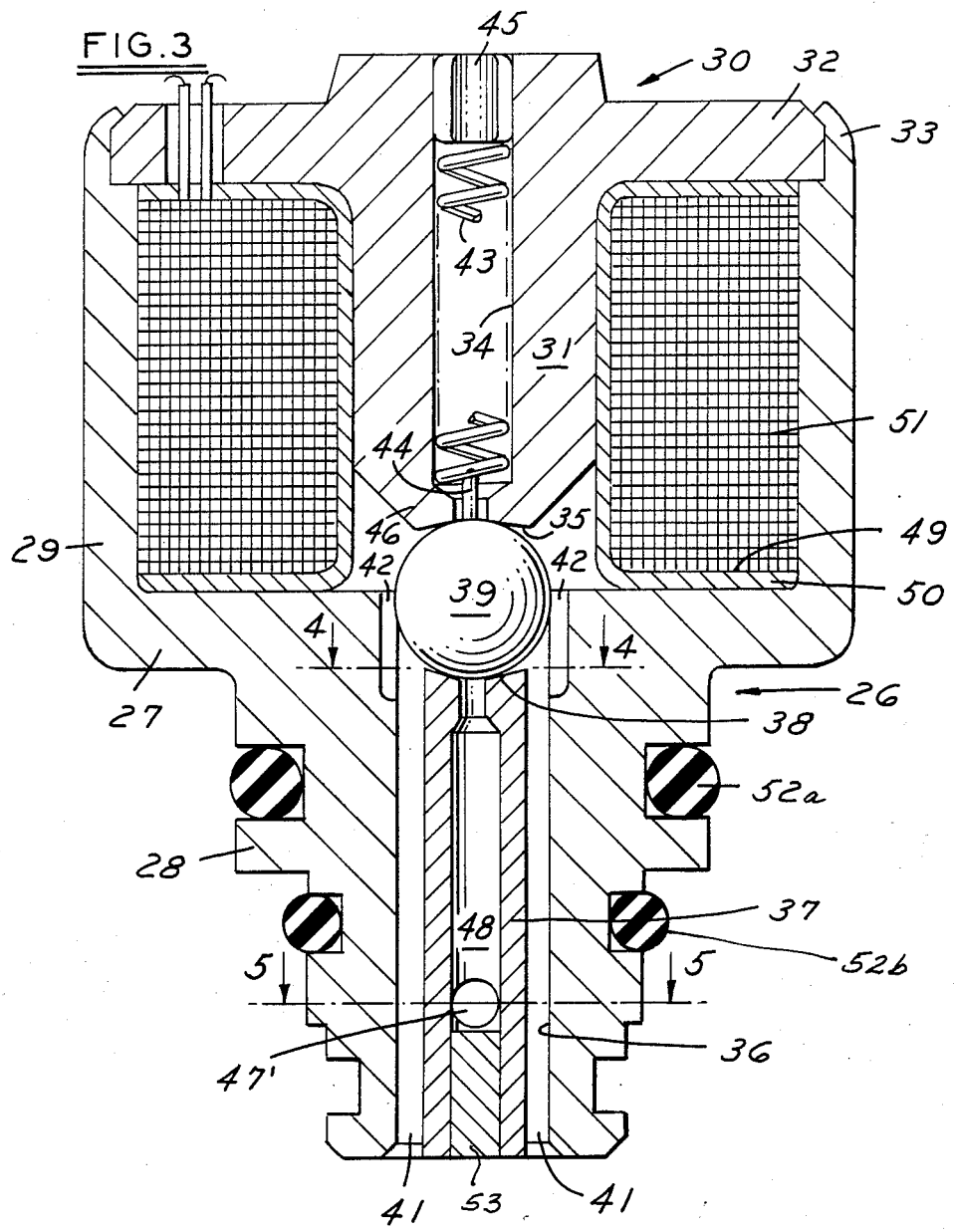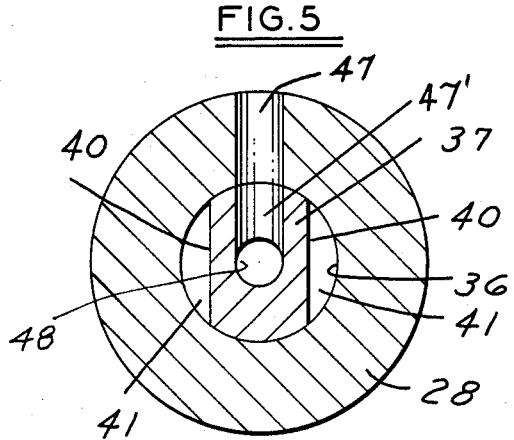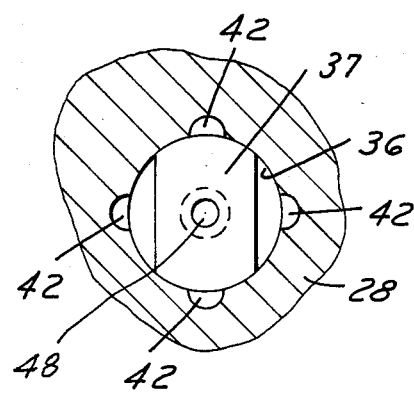

SOLENOID VALVE

This application is a continuation of application Ser. No. 577,853, filed Feb. 7, 1984, now abandoned.

This invention relates to solenoid valves such as are utilized in automatic transmissions.

BACKGROUND AND SUMMARY OF THE INVENTION

It has heretofore been suggested that the valves of a hydraulic transmission such as utilized in vehicles can be controlled by a microprocessor which includes sensors that sense variables such as road speed, throttle position and engine rpm and functions to provide pulses to pulse width modulated valves which in turn control spool valves for operating clutches in the transmission or control clutches directly.

In such pulse width modulator valves, it is desirable to be able to accurately control the pressure of the fluid.

The space requirements are quite small and therefore require a small valve which will function effectively in a pulse width modulated mode to provide the fluid at constant pressure.

Accordingly, among the objectives of the present invention are to provide a solenoid valve which is small, utilizes a minimum number of parts to produce the desired control of pressure and can be used in a pulse width modulated mode or in a steady state directional mode.

In accordance with the invention, the pulse width modulated valve comprises a valve housing including a transverse wall, an integral extension extending axially from the transverse wall and an integral peripheral wall extending axially from the periphery of the transverse wall in a direction opposite to the direction in which the axial extension extends. The solenoid valve also includes a pole member including a pole piece extending axially inwardly of the housing, an integral transverse wall extending radially outwardly into engagement with the peripheral wall and connected thereto. The pole piece has an axial passage therethrough and defines a first conical seat. The axial extension of the housing has an axial passage aligned with the opening of the pole, an insert is positioned in the axial passage in the axial extension and defines a second seat. A ball is interposed between the first and second seats and has limited movement between the seats. A spring means yieldingly urges the ball into engagement with the second seat. The insert has portions thereof spaced from the walls of the passage into which the insert extends defining passages to the exterior of the axial extension. The housing and pole member define an annular space and a coil assembly is positioned in the annular space, such that when fluid is applied to the axial passage in the insert and the coil is de-energized, the spring means holds the ball against the second seat and prevents flow through the axial passage in the insert while permitting communication between the passages defined by the insert about the ball and first seat through the axial passage in the pole and when the solenoid is energized, the ball is drawn toward the first seat to close communication to the axial opening in the pole and permit flow from the axial passage in the insert past the second seat through the passages defined by the insert to the exterior of the axial extension.

DESCRIPTION OF THE DRAWINGS

FIG. 3 is a vertical sectional view of the solenoid valve.

FIG. 4 is a fragmentary sectional view taken along the line 4—4 in FIG. 3.

FIG. 5 is a fragmentary sectional view taken along the line 5—5 in FIG. 3.

DESCRIPTION

Figure 1:
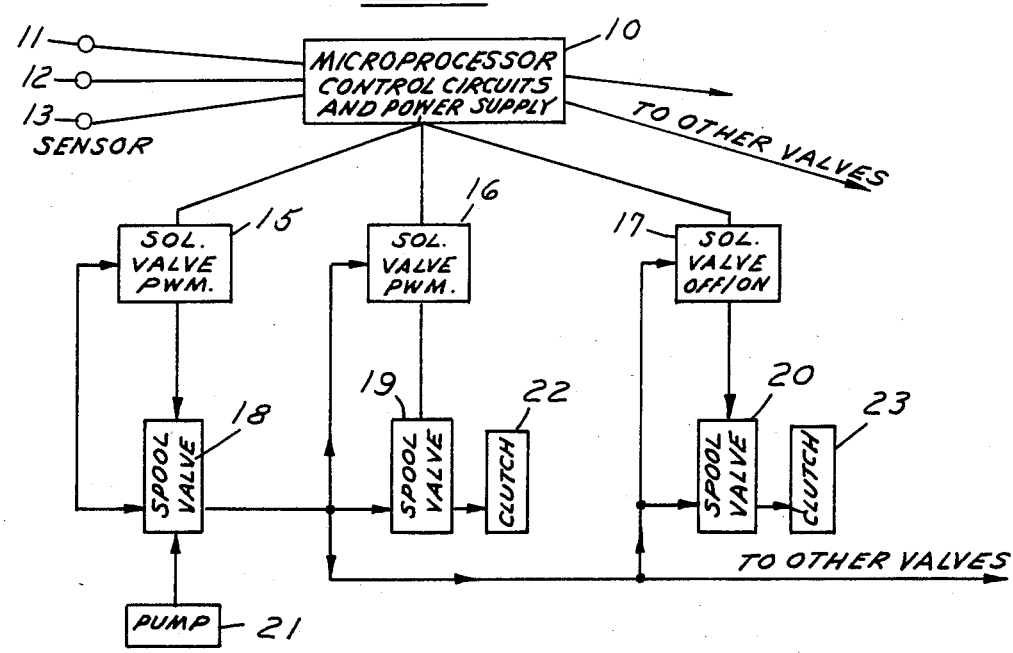
FIG. 1 is a schematic of a microprocessor system utilizing the solenoid valve embodying the invention.
Figure 2:
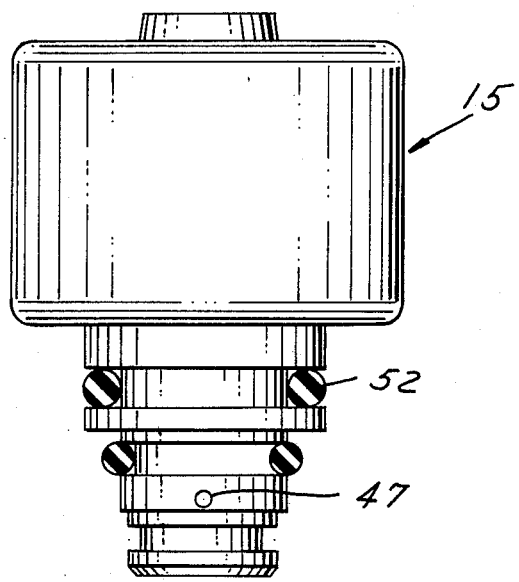
FIG. 2 is an elevational view of a solenoid valve embodying the invention.

Referring to FIG. 1, the solenoid valve embodying the invention is preferably used in a pulse modulated valve with a control system shown wherein a microprocessor 10 receives signals from sensors 11, 12 and 13 that monitor functions such as road speed, throttle position and engine rpm and provides signals to the microprocessor 10 which, in turn, controls solenoid valves 15, 16 and 17. The solenoid valves 15, 16 are pulse width modulated and function to control pilot operated spool valves 18, 19 and the solenoid valve 17 is of the on-off type for controlling the spool valve 20. The spool valve 18 operates to provide fluid under pressure from a pump 21 to the valve 15, solenoid valves 16, 17 and spool valves 9, 20. The spool valve 19 controls a part of the transmission such as a clutch 22 as does the spool valve 20 which controls a clutch 23.

Referring to FIGS. 2-5, the solenoid valve 15 or 16 embodying the invention comprises a housing 26 that includes a transverse wall 27 having an axial extension 28 and an integral peripheral wall 29. The valve further includes a pole member 30 having an axial pole 31 extending axially inwardly from an integral transverse wall 32 extending to the peripheral wall 29 and connected thereto as by bending the edge 33 of the wall 29 over the periphery of wall 32.

Pole 31 is provided with an axial passage 34 and a first frustoconical valve seat 35 at its lower end. The end of pole 31 is tapered. The axial extension 28 is provided with an passage 36 into which an insert 37 is press fitted. Passage 36 extends through transverse wall 27. The upper end of the insert 37 defines a second frustoconical valve seat 38. A ball 39 is interposed between the seats 35, 38 and has limited movement. The insert 37 has flattened portions as at 40 defining axial pasages 41 which extend from the area of the ball 39 to the exterior of the extension 28. Grooves 42 in the upper end of passage 36 in wall 27 adjacent seat 38 facilitate flow about the ball.

Spring means in the form of a compression spring 43 is interposed in the passage 34 between an apertured press fitted and welded pin 45 and a narrow portion 46 of the passage 34. As shown in FIG. 3, narrow portion 46 of opening 34 is reduced in cross-section as compared with the remainder of opening 34. Spring 43 includes an integral portion 44 which extends through the narrow portion 46 and engages ball 39 to yieldingly urge the ball toward the second seat 38. A transverse inlet 47 is provided to an aligned radial passage 47a and to an axial passage 48 in the insert the lower end of which is closed by a plug 53.

The housing 26 and pole member 30 define an annular cavity 49 in which a coil assembly including a coil holder 50 and an annular coil 51 are positioned. As shown the major portion of the ball 39 lies within the transverse wall 27 of the housing.

In use, O-rings 52a, 52b, are provided about the extension 28 so that the valve can be inserted in the appropriate place in the device such as a transmission with which it is used.

When the coil is de-energized, the spring 43 urges the ball 39 against the second seat 38 so there will be no flow from the inlet 47 through the passage 48. However, there will be free communication between the passages 41, grooves 42 about the ball 39 and through the passage 34 to the exterior which is normally connected to a sump or drain.

When the coil is energized, the ball 39 is drawn upwardly as viewed in FIG. 3 against the seat 35 so that fluid can flow from the inlet 47 through the passage 48 past the ball 39 and through the passages 41 to the exterior. Fluid from the pressure source is prevented from flowing out of the passage 34 by seating of the ball 39 against the seat 35.

The flux induced by the coil 51 will follow a path through center pole 31 into flange 32, through wall section 29 and end face 27, across the air gap between the ball 39 and bore 36, through ball 39, across the air gap between the ball 39 and center pole 31, and into the center pole 31. It should be noted that the seat 38 and, in this case, the entire insert 37 is a non-magnetic material and thus carries no appreciable magnetic flux.

Materials for the flux carrying components are normally low carbon mild steels or sintered irons while the non-magnetic seat material is normally an austenitic stainless steel for durability but could be any non-magnetic material.

In a pulse width modulated mode, controlled output pressure is obtained through modulation of the "on" to "off" time during each cycle at any given frequency. The valves have been used at operational frequencies of from 30 to 100 hertz but higher or lower frequencies could be used. The operating frequency is normally constant with the amount of "on" time being varied within the cycle to give the proper output pressure. Theoretically, the output pressure would be zero when the valve is "off" and input pressure when the valve is "on"; however, due to friction, inertia and elasticity in the hydraulic circuit, the output pressure tends to effectively average somewhere between zero and input depending on the ratio of "on" to "off" time.

Since this is a normally closed valve, in the unenergized state the ball must seal off the inlet pressure through the biasing force of the spring. Generally a "pop off" or "start leak" pressure is specified by the end user of the valve. Calibration for "pop off" pressure is made by applying this pressure to the inlet side of the ball either through actual fluid pressure or by mechanical means and the adjusting the spring by pushing the roll pin 45 against the spring until the ball just seals off the inlet. The roll pin is then either welded or mechanically staked in place to maintain the calibration.

A clearance of 0.0003" to 0.010" preferably is maintained between the ball 39 and bore 36 to minimize the air gap between them so as to optimize the magnetic circuit to minimize power requirements. Since the clearance is so small, the grooves 42 are necessary to allow the fluid to flow around the ball and out the exhaust port without undue restriction, and to minimize the hydraulic forces acting on the ball. The clearance between ball 39, when it engages one seat, and the other seat ranges between 0.006" and 0.015".

Use of the ball as both a sealing member and as the armature are basically required to obtain the desired performance from the small package size required.

The lead wires from the coil pass through the end flange and are then attached to a standard quick connector that also receives the wires from the microprocessor.

In a typical example, the coil is energized at a frequency of 100 hertz (cycles per second) which allows 10 ms of operation time for each cycle. The outlet pressure is varied by maintaining the duration of the energizing signal within the 10 ms time frame. The longer the signal is applied, the closer the average outlet pressure is to the inlet pressure. Ideally, the ratio of pressure out to pressure in is a straight line function of the ratio of energized time to available cycle time, that is, at an "on" time of 3 ms (or 30% of 10 ms available), the output pressure would be 30% of the input pressure. In actual practice, it takes about approximately 1.6 ms of on time to unseat the ball. This lag is due to the time required to build sufficient magnetic force to overcome the spring force and ball inertia; likewise, it takes approximately 1.5 ms for the ball to return to the normally closed position once the coil current is shut off. This device is able to accurately linearly regulate oil output pressure at 10%–100% of input pressure.

Figure 6:
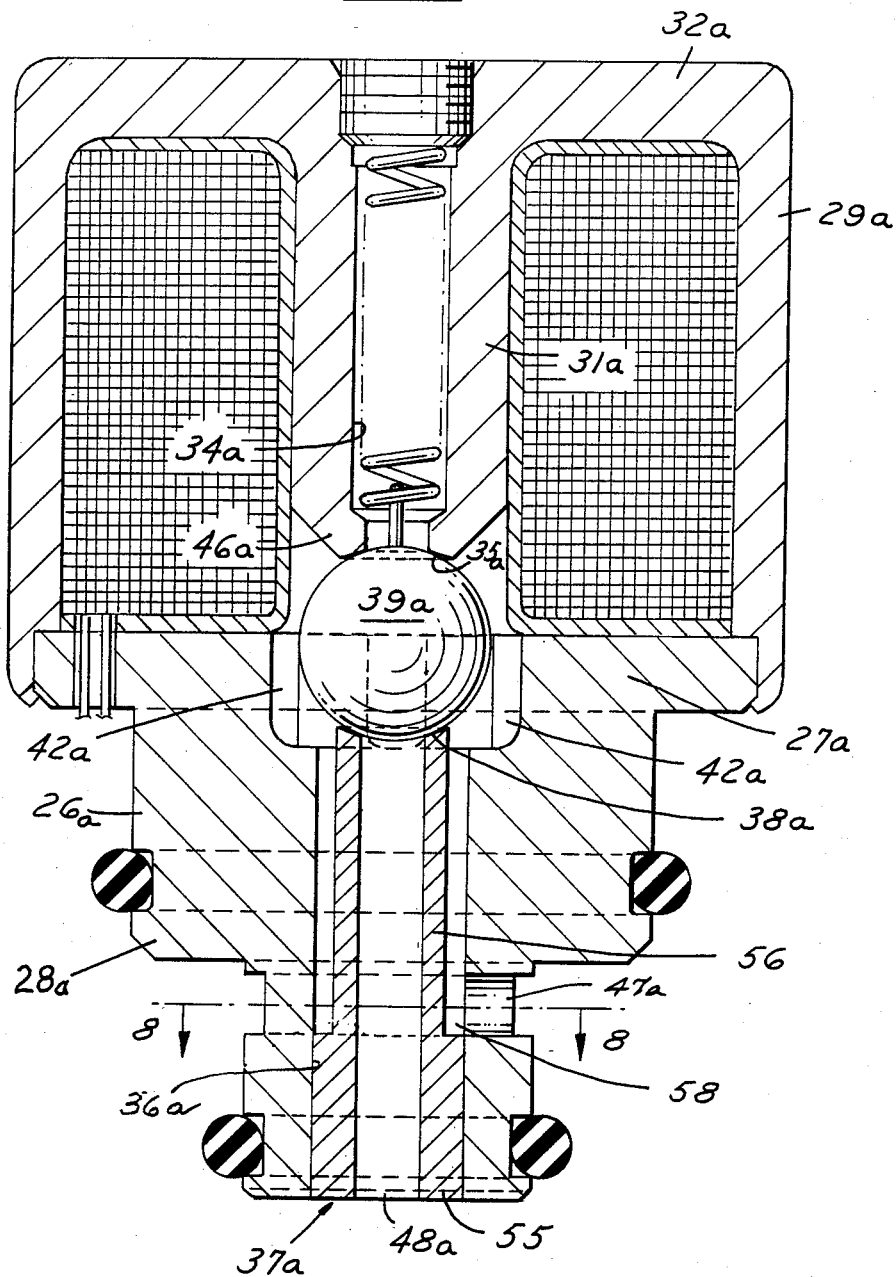
FIG. 6 is a vertical sectional view of a modified form of solenoid valve.
Figure 7:
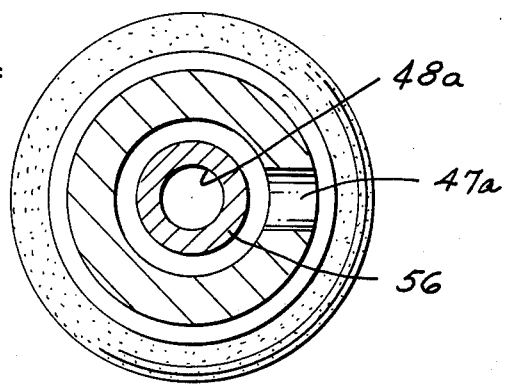
FIG. 7 is a fragmentary sectional view taken along the line 8—8 in FIG. 6.

Referring to FIGS. 6 and 7, in a preferred embodiment, for clarity like parts are given similar reference numerals with the suffix a. Insert 37a includes a cylindrical plug portion 55 which is press fitted in the lower end of passage 36a and a cylindrical portion 56 of smaller diameter on which seat 38a is formed. The axial passage 48a in insert 37a defines the inlet. A radial passage 47a in body 26a extends from the space or passage 58 between the smaller portion 56 of insert 37a and passage 36a. In the unenergized state, fluid flows from the pressurized device through passage 47a, space 58 around the ball 39a and out passage 34a into the sump. When the solenoid is energized, fluid will flow from the inlet 48a through passage 58 to the outlet passage 47a.

Thus, this form shortens the outlet fluid path resulting in higher flow. In addition this form is less expensive to manufacture since the press fit plug is eliminated and the machined flats 40 are eliminated.

Also, as shown in FIG. 6, the wall 29a is made part of transverse wall 32a rather than transverse wall 27a. Such an arrangement can be utilized where the lead wires are required to be positioned near the body 26a.

Although the valve shown is particularly designed for use in a pulse width modulated mode, it can also be utilized in an on-off or steady state directional mode.

I claim:
1. A normally closed solenoid valve comprising a valve housing including:
    (a) a first transverse wall of magnetic material,
    (b) an integral extension of magnetic material extending axially from said first transverse wall,
    (c) an annular peripheral wall of magnetic material extending axially from the periphery of the first transverse wall in a direction opposite to the direction in which the axis extension extends,
    (d) a pole member of magnetic material including a pole piece extending axially inwardly of the housing and

(e) a second transverse wall integral with and extending raidlly outwardly from the pole member into engagement with the peripheral wall and connected thereto, said pole piece having an axial passage therethrough, said pole piece defining a first seat, said first transverse wall and said axial extension of said housing having an axial passage aligned with the passage of said pole piece, (f) an insert of non-magnetic material positioned in an axial opening in said axial extension and having an axial passage, said insert defining a second seat, (g) a ball of magnetic material interposed between the first and second seats and having limited movement between said seats and extending into said axial opening in said first transverse wall and said axial extension with a close fit to optimize the magnetic circuit, said axial passage in said pole piece having a narrow end portion forming the first seat, sais narrow portion is reduced in cross section as compared with the remainder of the passage, spring means comprising a spring positioned in said axial passage of said pole piece and having projection yieldingly urged by said spring through said norrow portion of the axial passage to yieldingly urge said ball into engagement with the second seat, said housing and pole member defining an annular space, said insert having at least portions thereof spaced from the walls of the axial passage of the extension into which said insert extends defining passages communicating with the exterior of the axial extension, a coil assembly in said annular space, such that when fluid is applied to the axial passage in said insert and the coil is de-energized, said spring means holds the ball against the second seat and prevents flow through said axial passage in said insert while permitting communication between the passages defined by the insert about the ball and first seat through the axial passage in the pole piece, and when the solenoid is energized, the ball is drawn toward the first seat to close communication to the axial passage in the pole piece and permit flow from the axial passage in the insert about the ball past the second seat and through the passages defined by the insert to the exterior of the axial extension.

2. The solenoid valve set forth in claim 1 including a transverse passage in said axial extension and said insert providing an inlet to said axial passage in said insert.

3. The solenoid valve set forth in claim 1 wherein the major portion of said ball is positioned within the first mentioned transverse wall of said housing.

4. The solenoid valve set forth in claim 1 wherein said first seat and second seat comprise opposed frustoconical surfaces.

5. The solenoid valve set forth in claim 1 wherein said insert is press fitted into the axial passage of said extension and said portions spaced from the walls of said passage to define opposed flat surfaces on said insert.

6. The solenoid valve set forth in claim 5 including a plug closing the end of said axial passage in said insert, said axial extension and said insert having aligned radial passages communicating with the axial opening of the insert.

7. The solenoid valve set forth in claim 1 wherein said insert comprises a plug portion press fitted in the axial passage of said housing, said insert having a cylindrical portion of lesser cross sectional area than said passage adjacent the seat of said insert thereby defining an annular passage between the insert and the sides of the passage, said axial extension including a radial passage from the exterior of said axial extension to said annular passage.

8. The solenoid valve set forth in claim 1 wherein the clearance between the ball and the axail passage ranges between 0.003 inch to 0.010 inch.

9. The solenoid valve set forth in claim 1 wherein the clearance between the ball and one seat when it is in engagement with the other seat ranges between 0.006 inch and 0.015 inch.

10. The solenoid valve set forth in claim 1 wherein said first mentioned transverse wall is integral with said extension and said peripheral wall.

11. The solenoid valve set forth in claim 1 wherein said integral transverse wall is integral with said peripheral wall.

12. A normally closed solenoid valve comprising a valve housing including:
(a) a frist transverse wall of magnetic material,
(b) an extension of magnetic material extending axially from said transverse wall,
(c) a peripheral wall of magnetic material extending axially from the periphery of the transverse wall in a direction opposite to the direction in which the extension extends,
(d) a pole member of magnetic material extending axially inwardly of the housing, and
(e) a second transverse wall of magnetic material extending radially outwardly from the pole member into engagement with the peripheral wall, said pole member having an axial passage therethrough, said pole member defining a first seat within the housing, said first transverse wall and axial extension of said housing having an axial passage aligned with the passage in said pole member, (f) an insert of non-magnetic material positioned in said axial passage in said axial extension and having an axial passage, said insert defining a second seat opposite the first seat, a ball of magnetic material interposed between said first and second seats and extending into said axial passage in said first transverse wall and said axial extension with a close fit to optimize the magnetic circuit, said housing and pole member defining an annular space, one or more auxiliary passageways in the first transverse wall about the ball to facilitate flow about the ball, said insert having at least portions thereof spaced from the walls of the axial passage of the extension in which the insert extends defining passages communicating with the exterior of the axial extension and with said auxiliary passageway, a coil assembly in the said space such that when fluid is applied to the axial opening in said insert and the coil is de-energized, said spring means holds the ball against the second seat and prevents flow through said axial passage in said insert while permitting communication between the passages defined by the insert about the ball and first seat through the said axial passage in said pole piece having a narrow end portion forming the first seat, said narrow portion is reduced in cross section as compared with the remainder of the passage, spring means comprising a spring positioned in said axial passage of said pole piece and having a projection yieldingly urged by said spring through said narrow portion of the axial passage to yieldingly urge said ball into engagement with the second seat, axial passage in the pole piece, and when the solenoid is energized, the ball is drawn toward the first seat to close communication to the axial passage in the pole piece and permit flow from the axial passage in the insert about the ball past the second seat and through the passages defined by the insert to the exterior of the axial extension.

13. The solenoid valve set forth in claim 12 wherein the clearance between the ball, when it engages one seat, and the other seat ranges between 0.006" and 0.015".

14. The solenoid valve set forth in claim 13 wherein the clearance between the ball and the axial passage ranges between 0.003- and 0.010".

15. The solenoid valve et fort in claim 12 wherein the clearance between the ball and the axial passage ranges between 0.003" and 0.010".

16. The solenoid valve set forth in claim 12 wherein the major portion of the ball lies within the portion of the axial passage in the first transverse wall.

17. The solenoid valve set forth in claim 12 wherein said one or more passages in the first transverse wall comprise axial grooves.

18. A normally closed solenoid valve comprising a valve housing including:
(a) a first transverse wall of magnetic material,
(b) an extension of magnetic material extending axially from said transverse wall,
(c) a peripheral wall of magnetic material extending axially from the periphery of the transverse wall in a direction opposite to the direction in which the extension extends,
(d) a pole member of magnetic material extending axially inwardly of the housing, and
(e) a second transverse wall of magnetic material extending radially outwardly from the pole member into engagement with the peripheral wall, said pole member having an axial passage therethrough, said pole member defining a first seat within the housing, said first transverse wall and axial extension of said housing having an axial passage aligned with the opening in said pole member, (f) an insert of non-magnetic material positioned in said axial passage in said axial extension and having an axial passage, said insert defining a second seat opposite the first seat, a ball of magnetic material interposed between said first and second seats and extending into said axial passage in said first transverse wall and said axial extension with a close fit to optimize the magnetic circuit, the clearance between the ball and the axial passage ranging between 0.003" and 0.010", said axial passage in said pole piece having a narrow end portion forming in the firsst seat, said narrow portion is reduced in cross section as compared with the remainder of the passage, spring means comrpising a spring positioned in said axial passage of said pole piece and having a projection yieldingly urged by said spring through said narrow portion of the axial passage to yieldingly urge said ball into engagement with the second seat, one or more auxiliary passageways in the first transverse wall about the ball to facilitate flow about the ball, said insert having at least portions thereof spaced from the walls of the axial passage of the extension in which the insert extends defining passages communicating with the exterior of the axial extension and with said auxiliary passageway, said transverse walls, peripheral wall and pole member defining a space, and a coil assembly in the said space such that when fluid is applied to the axial passage in said insert and the coil is de-energized, said spring means holds the ball against the second seat and prevents flow through said axial opening in said insert while permitting communication between the passages defined by the insert about the ball and first seat through the axial passage in the pole, and when the solenoid is energized, the ball is drawn toward the first seat to close communication to the axial passage in the pole and permit flow from the axial passage in the insert about the ball past the second seat and through the passages defined by the insert to the exterior of the axial extension.

* * * * *

UNITED STATES PATENT AND TRADEMARK OFFICE
CERTIFICATE OF CORRECTION

PATENT NO. : 4,595,035
DATED : June 17, 1986
INVENTOR(S) : Frank G. Warrick

It is certified that error appears in the above-identified patent and that said Letters Patent are hereby corrected as shown below:

Column 3, line 63, " 0.0003" " should be --0.003"--
Column 6, line 13, "axail" should be --axial--
Column 6, line 13, after "passage", insert --of said extension--
Column 6, line 27, "frist" should be --first--

Signed and Sealed this

Eighteenth Day of November, 1986

Attest:

DONALD J. QUIGG

*Attesting Officer*    *Commissioner of Patents and Trademarks*